US009497902B2

(12) United States Patent
Marrs

(10) Patent No.: US 9,497,902 B2
(45) Date of Patent: Nov. 22, 2016

(54) FORCED-AIR CONVEYANCE HARVESTING SYSTEM FOR SMALL PRODUCE

(71) Applicant: Gregg A. Marrs, Selah, WA (US)

(72) Inventor: Gregg A. Marrs, Selah, WA (US)

(73) Assignee: BLUELINE MFG. CO., Moxee, WA (US)

( * ) Notice: Subject to any disclaimer, the term of this patent is extended or adjusted under 35 U.S.C. 154(b) by 0 days.

(21) Appl. No.: 14/708,173

(22) Filed: May 8, 2015

(65) Prior Publication Data

US 2015/0319930 A1 Nov. 12, 2015

Related U.S. Application Data

(60) Provisional application No. 61/991,211, filed on May 9, 2014.

(51) Int. Cl.
| *A01D 46/00* | (2006.01) |
| *A01D 46/26* | (2006.01) |
| *A01D 75/00* | (2006.01) |
| *A01D 46/28* | (2006.01) |

(52) U.S. Cl.
CPC ............ *A01D 46/26* (2013.01); *A01D 46/264* (2013.01); *A01D 46/285* (2013.01); *A01D 75/00* (2013.01); *A01D 2046/262* (2013.01); *A01D 2046/268* (2013.01)

(58) Field of Classification Search
CPC .. A01D 46/285; A01D 46/28; A01D 46/005; A01D 46/00; A01D 46/26; A01D 46/264; Y10S 56/08
USPC ....... 56/330, DIG. 8, 12.8, 328.1, 128, 13.2, 56/30
See application file for complete search history.

(56) References Cited

U.S. PATENT DOCUMENTS

| 2,660,021 | A | | 11/1953 | McDowell | |
|---|---|---|---|---|---|
| 3,006,131 | A | * | 10/1961 | McDowell | A01D 46/005 56/330 |
| 3,276,194 | A | * | 10/1966 | Mohn | A01D 46/005 56/330 |
| 3,590,566 | A | * | 7/1971 | Cutts, Sr. | A01D 46/28 56/330 |
| 3,601,964 | A | * | 8/1971 | Fisher | A01D 46/285 56/320 |
| 3,685,266 | A | * | 8/1972 | Mohn | A01D 46/28 56/330 |
| 3,720,050 | A | | 3/1973 | Rozinska | |
| 3,872,655 | A | * | 3/1975 | Davis, Sr. | A01D 45/16 56/27.5 |
| 4,016,711 | A | * | 4/1977 | Claxton | A01D 46/28 56/330 |
| 4,083,773 | A | * | 4/1978 | Clary | A01D 46/285 209/134 |
| 4,150,526 | A | * | 4/1979 | Burton | A01D 46/28 56/329 |
| 4,179,873 | A | * | 12/1979 | Scudder | A01D 46/28 56/328.1 |

(Continued)

FOREIGN PATENT DOCUMENTS

| FR | 2226926 A | * | 12/1974 | ............. | A01G 19/00 |
| SU | 677716 A | * | 8/1979 | ............. | A01D 46/24 |

*Primary Examiner* — Árpád Fábián-Kovács
(74) *Attorney, Agent, or Firm* — Svendsen Legal, LLC.

(57) ABSTRACT

A forced-air system for conveying a produce within a mechanized harvester of a row crop. The mechanized harvester includes a straddling over-carriage having a central channel for receiving a row of bushes or vines containing the produce to be harvested, and especially for blue berries. The harvester has a harvesting beater, including a spool with rotating rods, mounted within the central channel of the mechanized harvester. The forced-air system can employ offset harvesting beaters and a flexible air supply diffuser, to precisely direct the fan or blower-generated airstream, to direct the harvested fruits or produce to interior catch pans and conveyors within the harvester, and to help remove the produce from the bushes or vines.

16 Claims, 8 Drawing Sheets

(56) References Cited

U.S. PATENT DOCUMENTS

| | | | |
|---|---|---|---|
| 4,186,547 A * | 2/1980 | James | A01D 46/285 56/13.3 |
| 4,212,148 A * | 7/1980 | Brownlee | A01M 7/005 56/328.1 |
| 4,241,569 A * | 12/1980 | Bobard | A01D 46/285 56/330 |
| 4,292,792 A | 10/1981 | Burton | |
| 4,860,529 A | 8/1989 | Peterson et al. | |
| 5,074,107 A * | 12/1991 | Windemuller | A01D 46/28 56/12.8 |
| 5,113,644 A * | 5/1992 | Windemuller | A01D 46/285 56/12.8 |
| 5,174,093 A * | 12/1992 | Rodriguez | A01D 45/00 56/128 |
| 5,259,177 A * | 11/1993 | Windemuller | A01D 46/285 56/12.8 |
| 5,341,630 A | 8/1994 | Littau | |
| 5,355,667 A | 10/1994 | Scott | |
| 5,495,708 A * | 3/1996 | Scott | A01D 46/28 56/329 |
| 5,499,493 A * | 3/1996 | Rosset | A01D 46/00 56/13.3 |
| 6,155,036 A | 12/2000 | Pellenc | |
| 6,886,445 B2 * | 5/2005 | Adams | A01D 46/005 124/75 |
| 8,117,814 B2 * | 2/2012 | Sidhu | A01D 46/28 56/329 |
| 2011/0022231 A1 * | 1/2011 | Walker | A01D 46/264 700/259 |
| 2014/0250853 A1 * | 9/2014 | Young | A01D 46/26 56/329 |
| 2015/0223399 A1 * | 8/2015 | Kokanovic | A01D 46/005 56/328.1 |

* cited by examiner

FORCED-AIR CONVEYANCE HARVESTING SYSTEM FOR SMALL PRODUCE

CROSS-REFERENCE TO RELATED APPLICATION

This Non-Provisional Utility patent application claims the benefit of U.S. Provisional Application No. 61/991,211, filed May 9, 2014.

TECHNICAL FIELD

A forced-air conveyance and harvesting system for use with a mechanized harvester of a row crop, especially small produce, such as berries. The forced-air conveyance system uses an air blower to help transfer harvested produce. The mechanized harvester includes a straddling over-carriage having a central channel for receiving a row of bushes or vines containing the produce to be harvested, and especially for blue berries. Specifically, the forced-air conveyance and harvesting system employs a precisely directed fan or blower generated airstream not only help remove the fruit or produce from the bushes or vines, but importantly to direct the removed fruit to the interior 'catch pans,' collection surfaces and conveyors, within the harvester.

BACKGROUND OF THE INVENTION

There is a need for better harvesting efficiency, with less loss of harvested produce to the ground, in the mechanized picking of small fruits and produce, such as blueberries. Blowers and fans are often used with conventional harvesting systems to remove debris from the harvested material. However, beyond debris removal, these conventional fan systems fail to aid the harvesting and transport of the produce. Therefore, a need exists for improved fan-powered assistance, to aid in the mechanized harvesting and transport of small produce.

The following is a disclosure of the present invention that will be understood by reference to the following detailed description taken in conjunction with the accompanying drawings.

Figure 1:
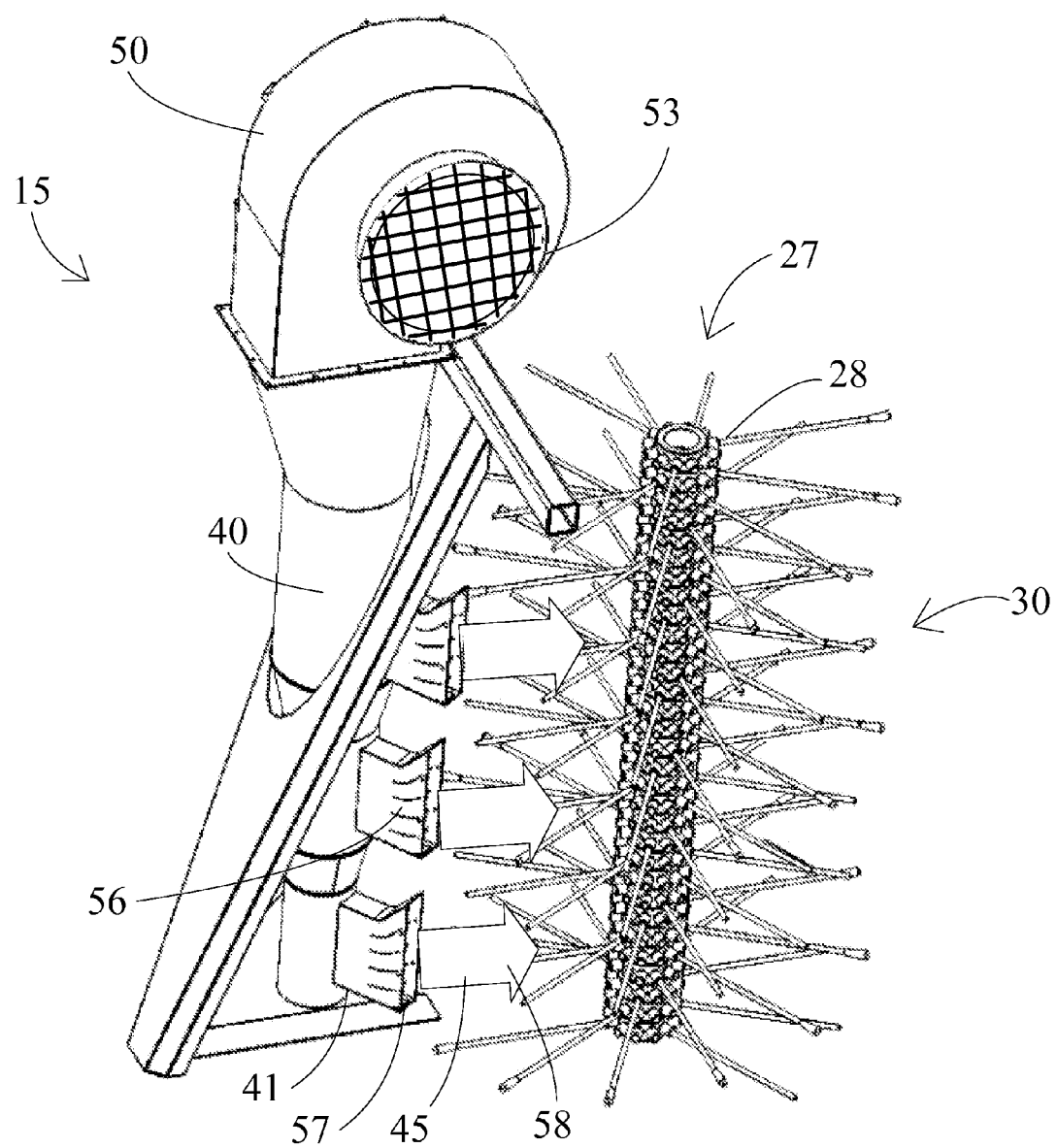
FIG. 1 is a perspective view of a portion of a forced-air conveyance harvesting system, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and that the embodiments are sometimes illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The invention provides a forced-air conveyance and harvesting system that employs a fan to assist or augment the harvest and conveyance of small produce, and is especially suited for use in the harvesting and conveyance of berries and similar crops. The forced-air conveyance harvesting system, or more simply the forced-air conveyance system, can also be referred to as a fan-augmented harvesting system, in that the forced-air is preferably provided by a fan, and the conveyance or transport of the produce is performed in the harvesting of the produce within a mechanical or mechanized harvester. Preferred embodiments of the forced-air conveyance system 15 are shown in FIGS. 1 through 8. As shown FIG. 2, the forced-air conveyance system includes a mechanized harvester 17, which may be simply referred to as a harvester. The harvester is mobile, and generally of a typical self-powered design, having an over-carriage 18 with a central channel 19 for straddling a crop row 20. Alternatively, the mechanized harvester may be towed behind a tractor.

The produce row 20 or 'crop row' of a produce 21 to be harvested is most preferably a row of bushes, but may alternatively be any vine, hedge or bush containing the produce and able to be gathered by the harvester 17. Preferably, the produce is a berry and most preferably a blueberry or similarly small and approximately spherical produce, including nuts, vegetables or fruits.

The terms "approximately" or "approximate" are employed herein throughout, including this detailed description and the attached claims, with the understanding that the terms denote a level of exactness as typical for the skill and precision in the generally applicable field of technology, and well known to those persons knowledgeable or skilled in agricultural practices, and especially in the design and engineering of mechanized harvesters 17 and related devices.

Figure 2:
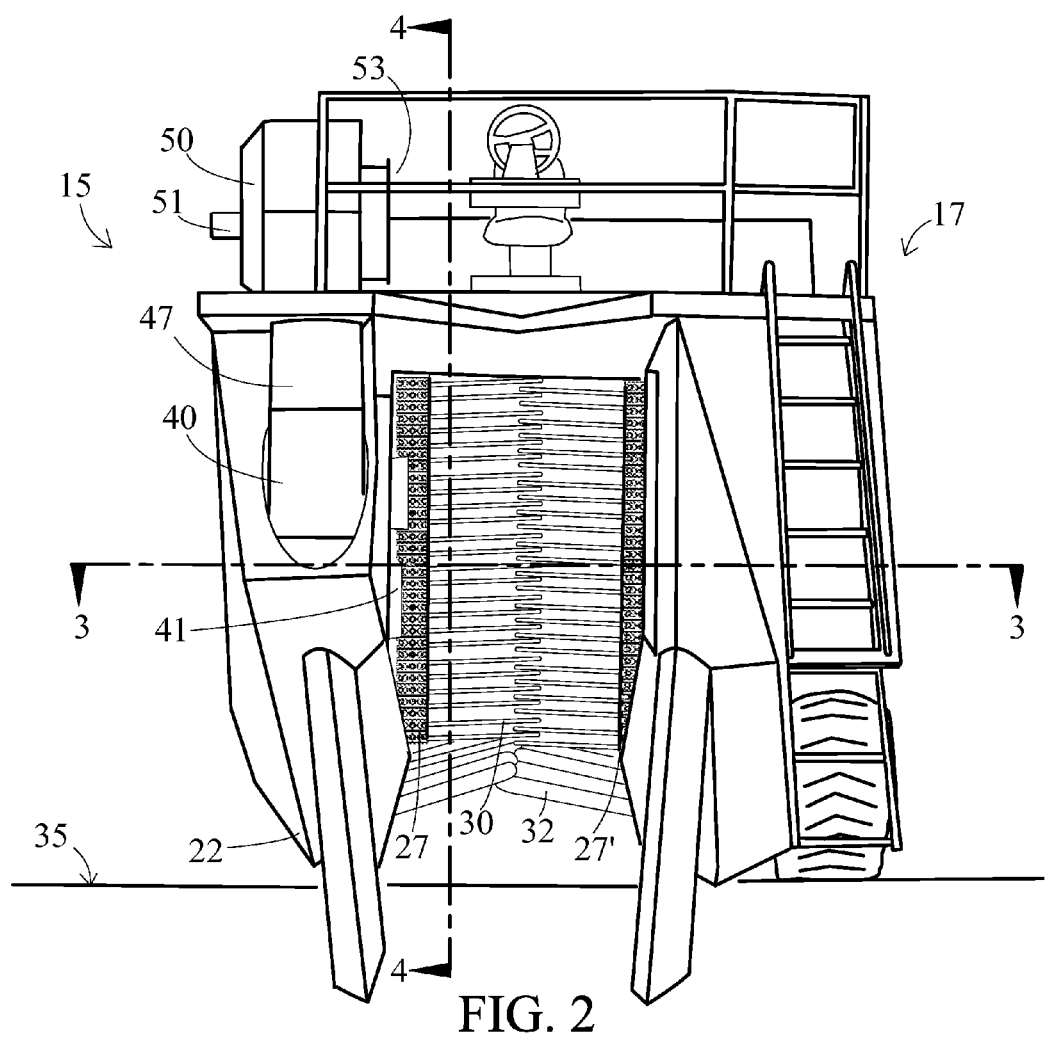
FIG. 2 is a front elevation view of a forced-air conveyance harvesting system, according to an embodiment of the invention.
Figure 3:
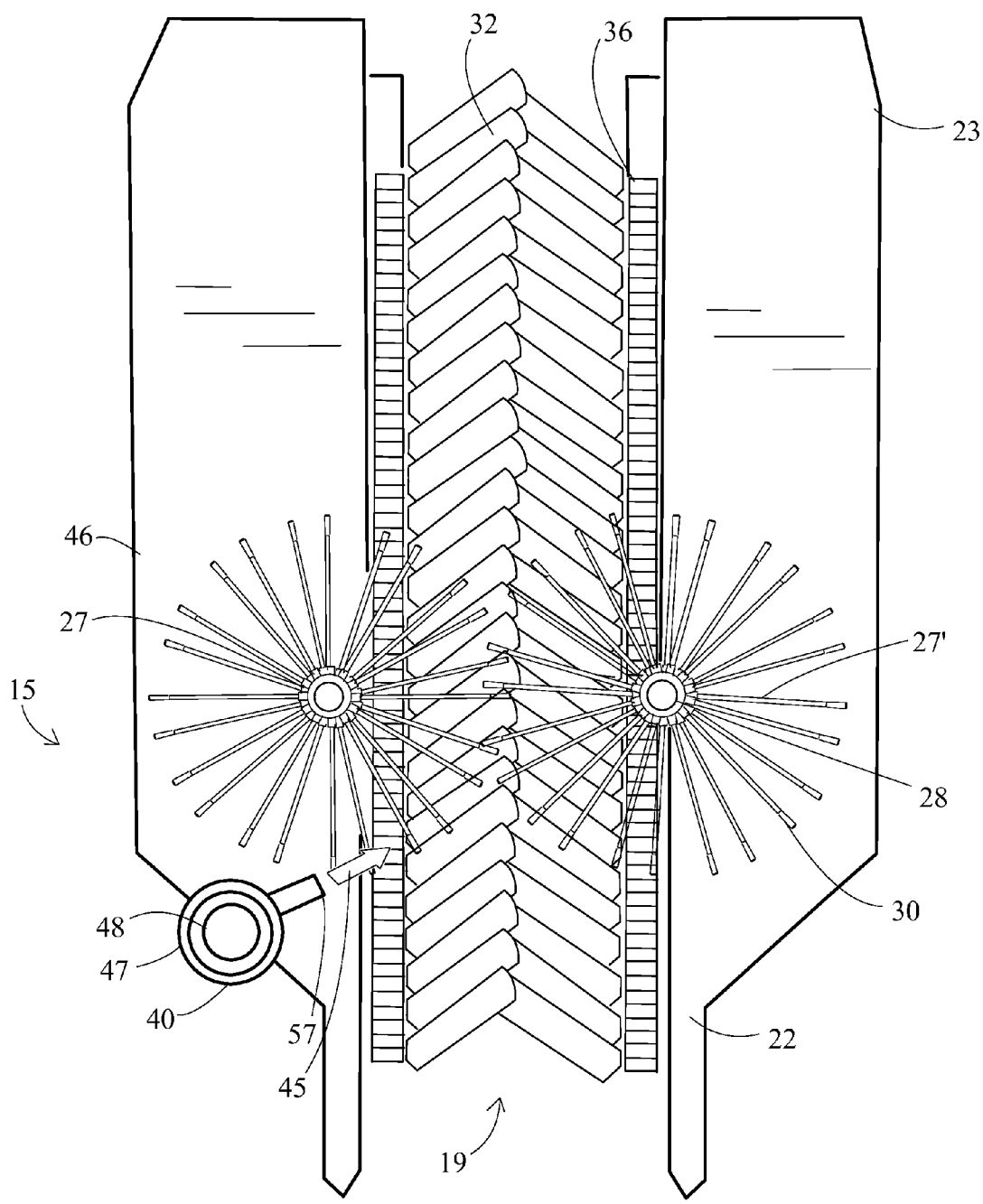
FIG. 3 is a partially sectional top view, approximately along section line 3-3 of FIG. 2, of a forced-air conveyance harvesting system, according to an embodiment of the invention.
Figure 4:
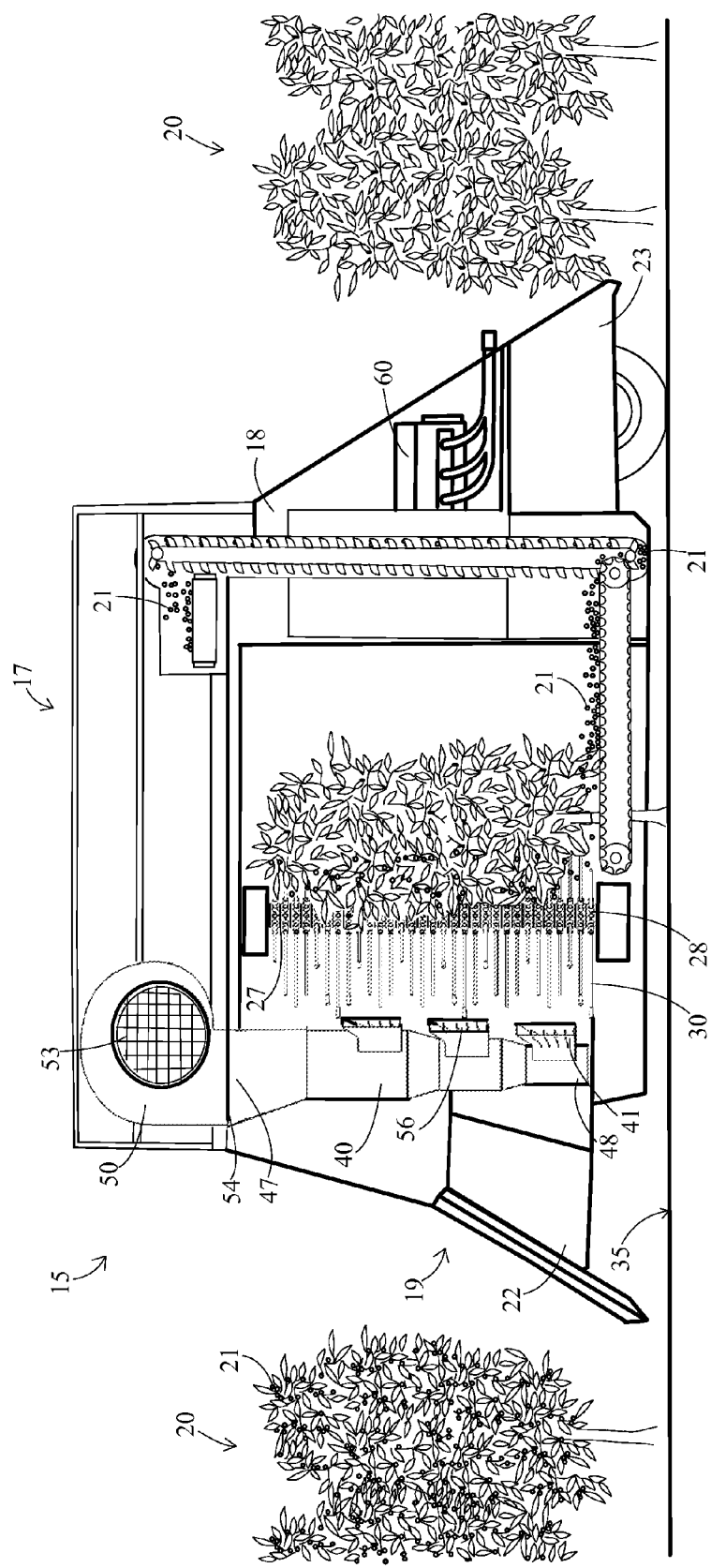
FIG. 4 is a partially sectional top view, approximately along section line 4-4 of FIG. 2, according to an embodiment of the invention.

Again, it is intended that the forced-air conveyance system 15 employed with the mechanized harvester 17, could be used with any variety of smaller fruit, berry, vegetable, or nut, all referable to as a produce 21 that is mechanically harvest-able by the harvester, as equipped with a harvesting beater 27. The conventional harvesting beater includes a vertical spool 28 or drum, mounted within the central channel 19 of the harvester. A plurality of beater rods 30 attach to the spool as shown in FIGS. 1 through 4. As shown in FIG. 4, the plurality of beater rods rotate to impact the row of bushes 20 containing the produce. The produce is dislodged from its bush and typically falls to a collection floor 31 of the harvester. Most typically, the collection floor of the harvester includes a plurality of shields or leaves 32 that prevent the produce from falling into a ground surface 35, below the harvester. The collection floor abuts to a set of interior catch pans and conveyors, generally referred to herein as interior catches 36, which receive the produce and transport the produce to bins or holding containers within or immediately exterior to the harvester.

A most preferred produce 21 for use with the forced-air conveyance system 15 is blue berries, and the blue berries are removed from the row of bushes 20 entering into the central channel 19 of the harvester 17 by action of the harvesting beaters 27. Though only one harvesting beater is required, as an alternative embodiment of the fan-augmented harvesting system 15, a multiple of harvesting beaters can be employed, each having stacked plurality of beater rods radiating from the central spool 28. As shown in FIGS. 2 and 3, an auxiliary harvesting beater 27' can be employed in the forced-air conveyance system.

Figure 6:
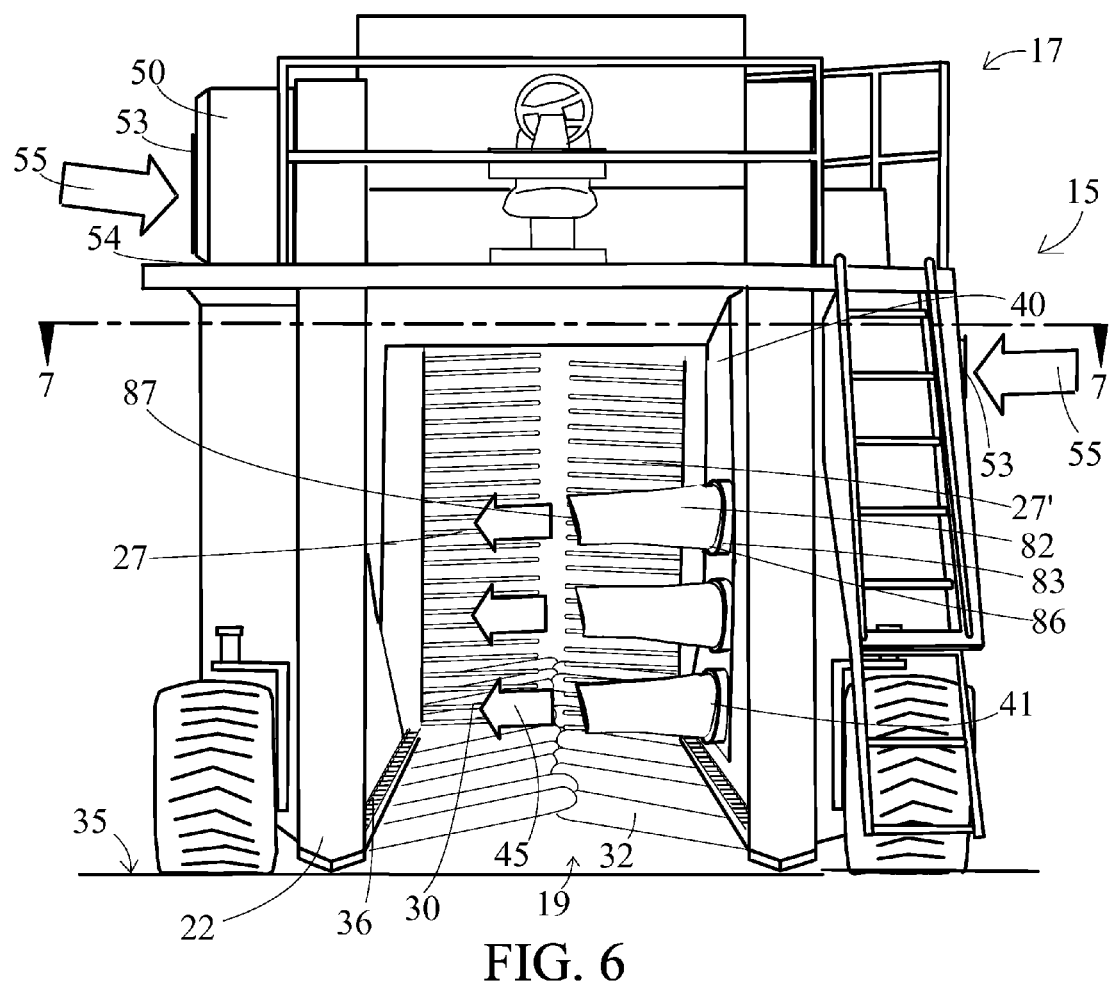
FIG. 6 is a front elevation view of a forced-air conveyance harvesting system, according to an embodiment of the invention.
Figure 7:
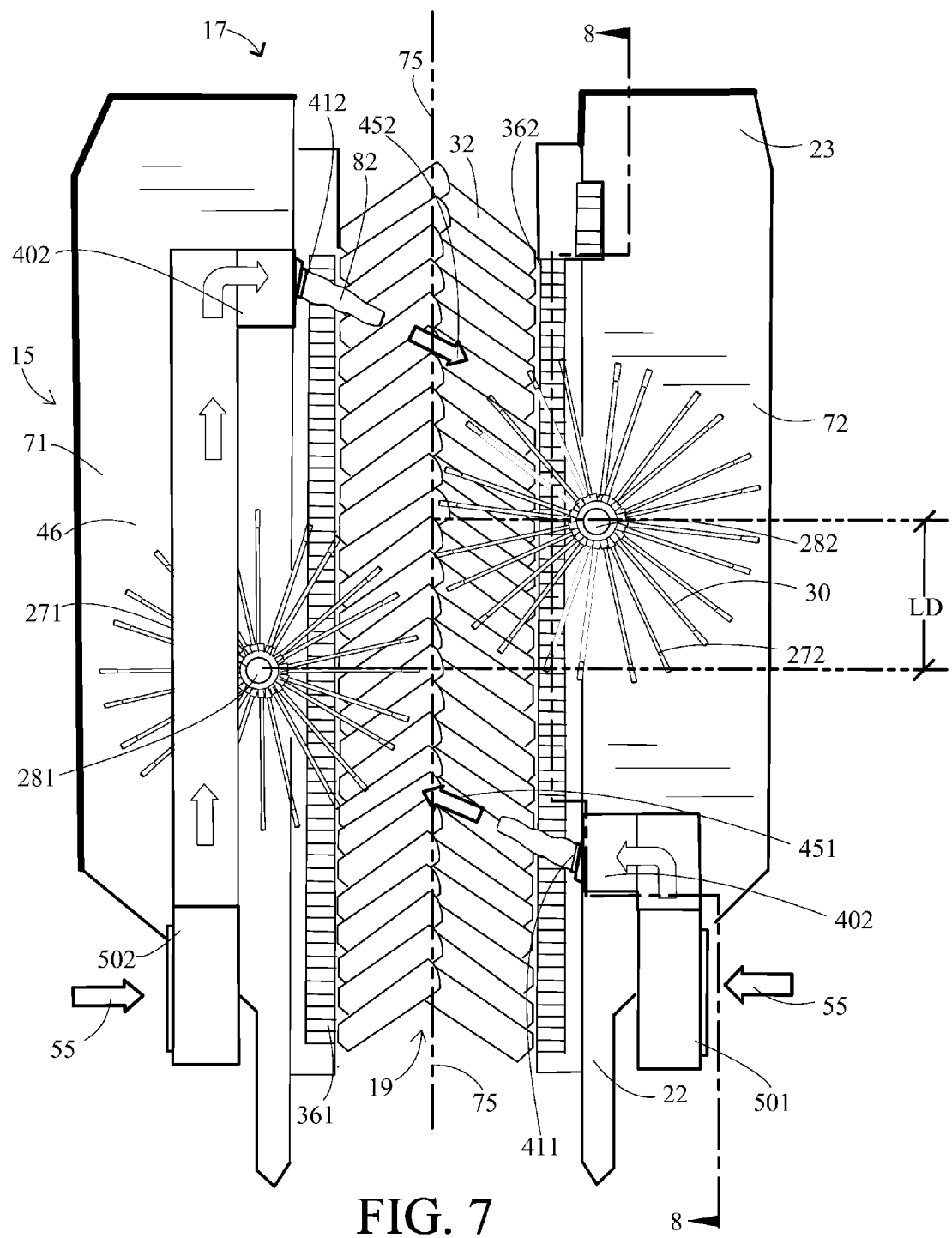
FIG. 7 is a partially sectional top view, approximately along section line 7-7 of FIG. 6, of a forced-air conveyance harvesting system, according to an embodiment of the invention.

The harvesting beater 27 can be a first harvesting beater 271, working with the auxiliary harvesting beater 27', which may also be defined as a second harvesting beater 272 in the forced-air conveyance system 15, as shown in FIGS. 6 and 7. For the 'two-beater' alternative preferred embodiment, the first harvesting beater includes a first spool 281 and the second harvesting beater includes a second spool 282.

As shown in FIGS. 1 through 4, the forced-air conveyance system 15 includes a duct tower 40, with a diffuser 41. Preferably, as shown in FIG. 4, a multiple of diffusers are employed, each diffuser mounted to the duct tower and each serving to direct an airstream 45 from the duct tower, to the produce 21 within the central channel 19 of the harvester 17. The duct tower may also be referred to herein simply as the duct. Specifically, as the beater rods 30 of the harvesting beater 27 dislodge produce within the central channel of the harvester, the airstream directed from the diffusers applies an aerodynamic lift and side-force to the produce. Specifically, the airstream is directed upward, and across the central channel 19, as shown in FIG. 3. The airstream serves to force the produce to float away from the central channel, to the interior catches 36, located at the perimeter of the central channel, at the over-carriage 18 of the harvester, as shown in FIG. 4. Again the interior catches are catch pans and conveyors within the harvester, employed to gather and store the produce as the harvester moves down the produce row 20.

Most preferably, the duct tower 40 is placed within a structural framework 46 of the over-carriage 18 of the harvester 17. As shown in the preferred embodiment of FIG. 1, the duct tower includes a top tower end 47 and a bottom tower end 48. The duct tower is sized to accommodate a large volume of air, as supplied by a blower 50. The blower is preferably mounted to the duct tower at the top tower end. Alternatively, any orientation of the duct tower and attached blower could be employed, which functions as a supply duct, to route and deliver the required airstream 45 to each diffuser 41. Most preferably, the blower is a conventional centrifugal fan, as selectable by persons skilled in the technology of forced air fans.

The blower 50 is powered by a blower motor 51, as shown in FIG. 2. The blower motor can be any conventional type of motor, such as an electric or hydraulic. Alternatively, a fan belt connected to an internal combustion engine could be used to power the blower. As preferred, a hydraulic motor is employed, connected to a recirculating hydraulic pump and engine 60, mounted on the harvester 17, as shown in FIG. 4.

Most preferably, the duct tower 40 reduces in diameter from the top tower end 47 to the bottom tower end 48, as shown in FIGS. 1 and 4. This reduction in duct diameter is preferred to achieve an approximately constant air velocity at each diffuser 41 along the duct tower. The blower 50 includes a blower intake 53 and a blower outlet 54, and receives an intake airstream 55 to generate and supply the airstream 45 to the duct tower 40, which directs the airstream to each diffuser 41. Preferably, each diffuser includes a plurality of directional vanes 56 located proximate to a diffuser outlet 57.

Most preferably, as shown in FIG. 1, each diffuser outlet 57 directs the airstream 45 in a vertically oriented knife airflow pattern 58. The diffuser outlet can be a nozzle or slot, but the preferred vertically oriented knife pattern is an 'air-curtain' or a 'knife airflow' airstream. Each diffuser's approximately vertically oriented knife airflow pattern is directed in an approximately horizontal an upward direction 59. Importantly, the airstream is directed at the harvesting beater 27, and specifically directed toward at the beater rods 30. This directed airflow helps direct the produce 21, removed from the row of bushes 20 more generally definable as a "produce row," to the interior catch pans and conveyors 36 within the harvester 17. The directed airflow also aids the harvesting beater in dislodging the produce or the preferred blue berries from the produce row, which are received into the central channel 19 of the harvester.

In the preferred alternative embodiment of the harvester configuration shown in FIGS. 2 and 3, two harvesting beaters are used, specifically the harvesting beater 27 and the auxiliary harvesting beater 27'. Optionally, it is envisioned that the harvesting beater and auxiliary harvesting beater may be 'offset' relative to the crop row, and optionally each equipped with a dedicated duct tower for receiving a forced airstream from the blower 50 and routed to diffusers 41, on each tower to augment the beater rods with the precisely directed and high velocity airstream 45 from each diffuser.

FIGS. 5 through 8 show an alternative preferred embodiment of the forced-air conveyance system 15. Again, the most preferred produce 21 for use with the forced-air conveyance system is blue berries, and the blue berries are removed from the row of bushes 20 entering into the central channel 19 of the harvester 17 by action of one or more of the harvesting beaters 27. In the embodiment shown in FIGS. 6 through 8, the harvesting beaters include the first harvesting beater 271 and the second harvesting beater 272, each having the stacked plurality of beater rods 30 radiating from the first spool 281 and the second spool 282, respectively.

As preferred in this alternative embodiment of the forced-air conveyance system 15, the first harvesting beater 271 and the second harvesting beater 272 are offset, relative to the other, along the length of the harvester. The first harvesting beater and the second harvesting beater are not side-by-side across the central channel 19 of the harvester, as typical in conventional harvesters, but at a "Linear Offset Distance" LD.

From the top view of the forced-air conveyance system 15, as shown in FIG. 7, the harvester 17 includes a first side 71 and a second side 72. The first side the second side are separated by the center channel 19 of the harvester. As preferred, the first harvesting beater 271 mounts as shown in FIG. 7, on the first side of the harvester proximate to the center channel of the harvester. The second harvesting beater 272 also mounts as shown in FIG. 7, preferably on the second side of the harvester proximate to the center channel of the harvester.

Most preferably, the first harvesting beater 271 is positioned closer to the frontward end 22 of the harvester 17 than the second harvesting beater 272, and the second harvesting beater is positioned closer to the rearward end 23 of the harvester than the first harvesting beater. Alternatively, the first harvesting beater can be positioned closer to the rearward end of the harvester than the second harvesting beater, and the second harvesting beater can be positioned closer to the frontward end of the harvester, relative to the first harvesting beater.

Specifically, the aforementioned Linear Offset Distance LD is defined as a distance from the first harvesting beater 271 to the second harvesting beater 272, as measured along a harvester axis 75. As shown in FIG. 7, the harvester axis is defined as a line along the length of the harvester 17, from the frontward end 22 to the rearward end 23 and parallel to the central channel 19 of the harvester.

To measure the Linear Offset Distance LD, the harvester axis 75 is constructed from the frontward end 22 of the harvester to the rearward end 23 of the harvester within the central channel 19 of the harvester, as shown in FIG. 7. The harvester axis is parallel to the central channel. A first spool line 76 can be constructed perpendicular to the harvester axis, from the harvester axis to the first spool of the first harvesting beater. Additionally, a second spool line 77 can be constructed perpendicular line to the harvester axis, from the harvester axis to the second spool of the second harvesting beater. The first spool line and the second spool line are parallel to each other, and each preferably intersect the spool 28 at the approximate center of the vertical spool of the harvesting beaters 27.

As shown in FIG. 7, the Linear Offset Distance LD is the distance between the first spool line 76 and the second spool line 77. Most preferably, the Linear Offset Distance is approximately twice the length of the beater rods 30, or approximately six feet, but may be a little as one foot, or as great as the length of the harvester axis, from the frontward end of the harvester to the rearward end. Importantly, the Linear Offset Distance is measured when the first spool 281 and the second spool 282 are 'at rest' and not pushed or pulled out of their normal operating position. The harvesting beaters 27 can adjust to variation in width of the produce row 20, and this variation from the spools resting position is not considered when measuring the Linear Offset Distance. The Linear Offset Distance is simply the first harvesting beater offset relative to the second harvesting beater, along the harvester axis, sufficient to provide for, or to allow for each airstream 45 from the diffuser outlet 57 serving each harvesting beater, to be positioned across the central channel 19 from the harvesting beater.

FIG. 7 shows the Linear Offset Distance LD allowing each airstream 45 from the diffuser outlet 57 serving any particular harvesting beater 27, to be positioned across the central channel 19 from that harvesting beater. Specifically, the first harvesting beater 271 is positioned closer to the frontward end 22 of the harvester 17 as compared to the second harvesting beater 272, with the first harvesting beater and the second harvesting beater separated by the Linear Offset Distance. As discussed above, the duct tower 40 functions as a forced-air supply duct, to route and deliver the required airstream 45 to each diffuser 41 on the duct tower. As shown in FIG. 7, a first duct tower 401 and a second duct tower 402 are employed in the preferred alternative of the forced-air conveyance system 15. The first duct tower directs a first airstream 451 to a first set of diffusers 411, and the second duct tower directs a second airstream 452 to a second set of diffusers 412.

Positioned proximate to the frontward end 22 of the harvester 17, the first airstream 451 from the first set of diffusers 411 on the first duct tower 401 is directed to the first harvesting beater 271, with the first duct tower located across the central channel 19 of the harvester from the first harvesting beater. Positioned proximate to the rearward end 23 of the harvester, the second airstream 452 from the second set of diffusers 412 on the second duct tower 402 is directed to the second harvesting beater 272, with the second duct tower located across the central channel 19 of the harvester from the second harvesting beater.

This unique positioning and directing of the airstream 45 from the diffusers 41 toward the harvesting beater 27 greatly improves transportation or conveyance of the produce 21 removed and separated from the produce row 20 that enters the central channel 19 of the harvester 17. Importantly, the forced-air conveyance system 15 directs the produce toward the interior catches 36 of the harvester. The directed action of the airstream also helps to remove the produce from the produce row, which is preferably the removal of blueberries from a row of blueberry bushes entering the central channel of the harvester.

Specifically, a first interior catch 361 is located proximate to the first side 71 of the harvester, with the first airstream 451 from the first set of diffusers 411 directed to the first harvesting beater 271, and with the first airstream lofting the produce toward the first interior catch. A second interior catch 362 is located proximate to the second side 71 of the harvester, with the second airstream 452 from the second set of diffusers 412 directed to the second harvesting beater 272 lofting the produce toward the second interior catch. The lofting of the produce is achieved with the aerodynamic lift and side-force directed to the produce from the airstream 45. The diffusers can be positioned as needed to direct the airstream across the beater rods 30 of the harvesting beaters 27 because of the separation of the harvesting beaters by the Linear Offset Distance LD, with the first duct tower 401 mounted on the second side of the harvester supplying the first airstream from a first blower 501 directed toward the first harvesting beater, and the second duct tower 402 supplying a second airstream from a second blower 502 directed toward the second harvesting beater.

Another feature of the Linear Offset Distance LD is that it prevents the beater rods 30 of the first beater 271 from impacting the beater rods of the second beater 272. The advantage of offsetting the first spool 281 relative to the second spool 282, as provided by the Linear Offset Distance, is that the beater rods 30 of the first beater 271 cannot reach the beater rods of the second beater 272. The Linear Offset Distance prevents unwanted beating action against the produce 21 and the produce row 20, which can occur when the beater rods of the first beater impact the beater rods of the second beater. Additionally, the beater rods last longer in service with less damage and potential fracture, by avoiding beater-to-beater impacts, between the beater rods of the adjacent harvesting beaters.

As shown in FIGS. 5 through 8, this alternative embodiment of the forced-air conveyance system 15 includes a first duct tower 401, and a second duct tower 402, each with multiples of the diffusers 41. Each diffuser mounts to the duct tower and each serves to direct the airstream 45 from the duct tower, to the produce 21 within the central channel 19 of the harvester 17.

Figure 5:
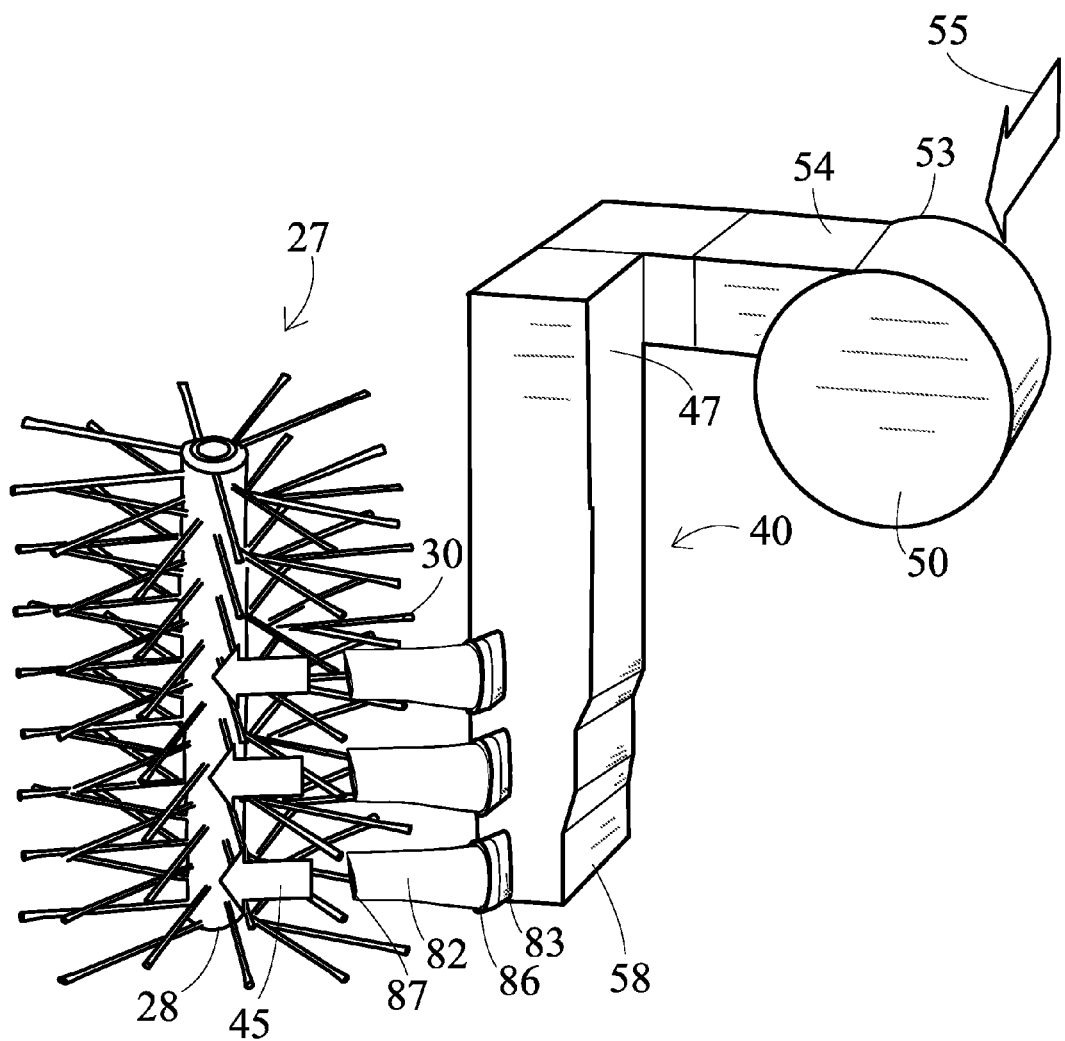
FIG. 5 is a perspective view of a portion of a forced-air conveyance harvesting system, according to an embodiment of the invention.
Figure 8:
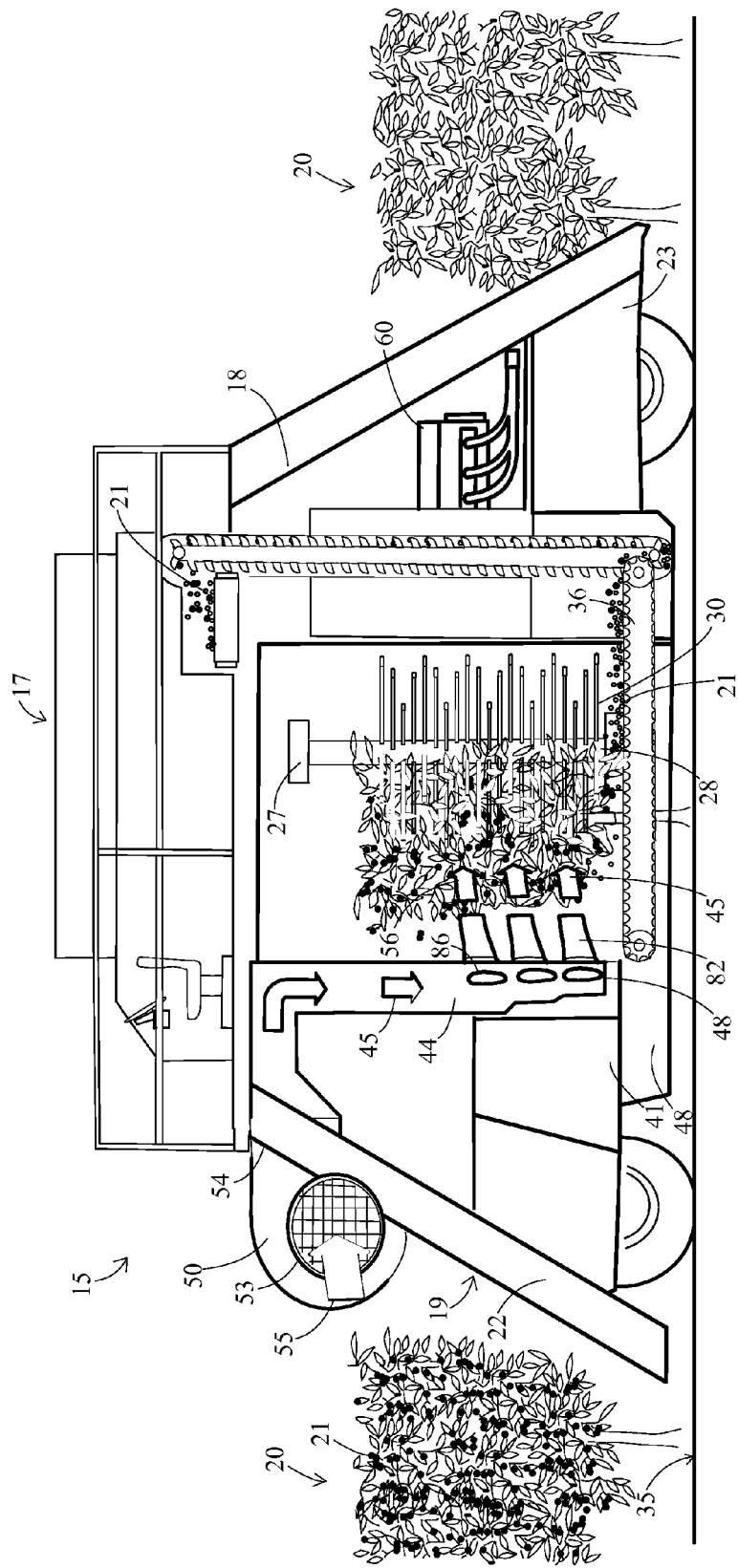
FIG. 8 is a partially sectional top view, approximately along section line 8-8 of FIG. 7, of a forced-air conveyance harvesting system according to an embodiment of the invention.

Most preferably for the forced-air conveyance system 15, the first duct tower 401 and the second duct tower 402 each reduce in diameter from the top tower end 47 to the bottom tower end 48, as shown in FIGS. 5 and 8. This reduction in duct diameter is preferred to achieve an approximately constant air velocity at each diffuser 41 along each duct tower 40, with the first duct tower supplying the first airstream 451 from the first blower 501 to the first set of diffusers 411, and the second duct tower 402 supplying a second airstream 452 from a second blower 502, to the first set of diffusers 411. The first set of diffusers and the second set of diffusers can each be a single diffuser, oriented approximately vertically along the duct tower. However, as preferred, the first set of diffusers and the second set of diffusers each include a multiple of diffusers positioned along the first duct tower and the second duct tower, respectively.

As shown in FIG. 5, for a preferred alternative embodiment, each diffuser includes a diffuser hood 82 located proximate to a tower outlet 83. The diffuser hood is tubular and formed from a flexible material, and preferably a fabric tube made of a flexible, tear-proof material, as is known to those skilled in the selection of heavy-duty industrial fabric materials. A vinyl, rubber or silicone coated, nylon rip-resistant type of fabric is most preferred, such as nylon taffeta with a PVC vinyl coating or backing. As Shown in FIG. 8, the diffuser hood preferably tapers slightly along its length from a hood inlet 86 attached to the tower outlet, to a hood outlet 87. The airstream 45 exits the diffuser hood at the hood outlet and the force of the airstream serves to inflate the diffuser hood and point the exiting airstream in the desired direction, toward the produce row 20 proximate to the beater rods 30 of the harvesting beater 27.

Again, this focused and directed airstream 45 not only helps transport the produce 21 removed from the produce row to the interior catches 36 within the harvester 17, but importantly it aids or augments the action of the harvesting beater 27 in dislodging the produce or the preferred blueberries from the produce row 20 or row of bushes, which are then received into the central channel 19 of the harvester. Additionally, the flexibility of the diffuser hoods 82 allows for the extension of the diffuser 41 into the produce row without damage to produce and bushes or vines of the produce row.

As shown in FIGS. 5 and 8, a preferred embodiment of the forced-air conveyance system 15, includes three diffuser hoods 82 on each duct tower 40, with each diffuser hood extended toward the harvesting beater 27 with a substantially horizontal airstream 45. Most preferably, the airstream 45 is directed across the beater rods 30 of the harvesting beater and not directly at the spool 28 of the harvesting beater. The orienting of the airstream across the beater rods maximizes the impact of the airstream upon the produce 21 still attached to the bushes or vines of the produce row 20, along with the most desirable effect of transporting any dislodged produce toward the interior catches 36 of the harvester 17.

For the forced-air conveyance system 15, the combined effect of the Linear Offset Distance LD of the first harvesting beater 271 relative to the second harvesting beater 272, coupled with the extension of the airflow 45 from the duct tower 40 to the harvesting beaters, provides a significant increase in produce harvesting efficiency. The forced-air conveyance system not only reduces the quantity of unpicked produce 21 remaining on the vines or bushes or the produce row, but also is gentler on the produce and produce row. Use of the forced-air conveyance system results in less bruising to the fragile produce and less damage to the branches and vines of the produce row, as compared to conventional spooled beater and shaker types of harvesters.

In compliance with the statutes, the invention has been described in language more or less specific as to structural features and process steps. While this invention is susceptible to embodiments in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A forced-air system for conveying a produce with a harvester, the system including:
   a mechanized harvester for use in the harvesting of the produce, the mechanized harvester including a central channel for straddling and receiving a produce row, and the mechanized harvester equipped with a harvesting beater, the harvesting beater including a spool mounted within the central channel of the mechanized harvester;
   a plurality of beater rods attached to the spool, the plurality of beater rods rotate-able to impact the produce row to dislodge the produce, the produce dislodged and collected by interior catches of the mechanical harvester;
   a duct tower mounted to the mechanized harvester, the duct tower including a diffuser;
   a blower attached to the duct tower, the blower for supplying an airstream to the diffuser, the airstream directed by the diffuser toward the harvesting beaters; and
   the airstream directed to transport the produce dislodged, to the interior catches within the harvester.

2. The forced-air system of claim 1, wherein the airstream from the diffuser is directed toward the produce within the central channel of the harvester.

3. The forced-air system of claim 1, wherein the airstream from the diffuser is a vertically oriented curtain pattern of air flow.

4. The forced-air system of claim 1, wherein:
   the produce is blueberries, the blueberries are removed from the row of bushes entering into the central channel of the harvester by action of the harvesting beaters with the airstream.

5. The forced-air system of claim 1, wherein the harvesting beaters are a multiple of harvesting beaters.

6. The forced-air system of claim 1, wherein the produce includes a fruit, a berry, a vegetable, or a nut.

7. The forced-air system of claim 1, wherein:
   the diffuser is a multiple of diffusers, each of the multiple of diffusers mounted to the duct tower and each of the multiple of diffusers directing the airstream toward the harvesting beaters within the central channel of the harvester.

8. The forced-air system of claim 7, wherein the airstream from each of the multiple of diffusers is directed toward the produce within the central channel of the harvester.

9. The forced-air system of claim 8, wherein the airstream from each of the multiple of diffusers is a vertically oriented curtain pattern of air flow.

10. A forced-air produce conveyance harvesting apparatus, the apparatus including:

a mechanized harvester for use in the harvesting of a produce, the mechanized harvester having a frontward end opposite a rearward end, and the harvester surrounding a central channel, with a produce row received into the central channel proximate to the frontward end of the harvester;

a harvester axis from the frontward end of the harvester to the rearward end of the harvester within the central channel of the harvester, the harvester axis parallel to the central channel;

a first harvesting beater within the mechanized harvester, the first harvesting beater including a first spool mounted in the central channel of the mechanized harvester, and a second harvesting beater within the mechanized harvester, the second harvesting beater including a second spool mounted in the central channel of the mechanized harvester;

a plurality of beater rods attached to the first spool and the second spool, the plurality of beater rods rotate-able to impact the produce row to dislodge the produce, the produce dislodged and collected by an interior catch within the mechanical harvester;

a duct mounted to the mechanized harvester, the duct including a diffuser;

a blower attached to the duct, the blower for supplying an airstream to the diffuser, the airstream directed by the diffuser toward the first and second harvesting beaters, and the airstream directed to transport the produce dislodged, to the interior catches within the harvester;

the first harvesting beater offset relative to the second harvesting beater along the harvester axis;

the diffuser having a diffuser hood attached to the duct, the diffuser hood formed of a flexible material; and the airstream inflates the diffuser hood and the airstream exits the diffuser hood directed toward the produce row proximate to the beater rods of the harvesting beater.

11. The forced-air produce conveyance harvesting apparatus of claim 10, wherein the diffuser hood tapers along its length from a hood inlet attached to the tower outlet, to a hood outlet where the airstream exits the diffuser hood.

12. The forced-air produce conveyance harvesting apparatus of claim 10, wherein:
a linear offset distance separates the first harvesting beater from the second harvesting beater;
a first spool line perpendicular to the harvester axis, from the harvester axis to the first spool of the first harvesting beater;
a second spool line perpendicular to the harvester axis, from the harvester axis to the second spool of the second harvesting beater; and
the linear offset distance defined as the distance between the first spool line and the second spool line.

13. The forced-air produce conveyance harvesting apparatus of claim 10, wherein the first spool line is parallel to the second spool line.

14. The forced-air produce conveyance harvesting apparatus of claim 10, wherein the produce includes a fruit, a berry, a vegetable, or a nut.

15. The forced-air produce conveyance harvesting apparatus of claim 10, wherein the produce includes any smaller fruit, berry, vegetable, or nut that is mechanically harvestable.

16. The forced-air conveyance harvesting apparatus of claim 10, wherein the airstream from the diffuser is a vertically oriented curtain pattern of air flow.

\* \* \* \* \*